No. 884,716. PATENTED APR. 14, 1908.
G. J. COOK.
WATER TROUGH FOR POULTRY CRATES OR COOPS.
APPLICATION FILED MAR. 27, 1906.
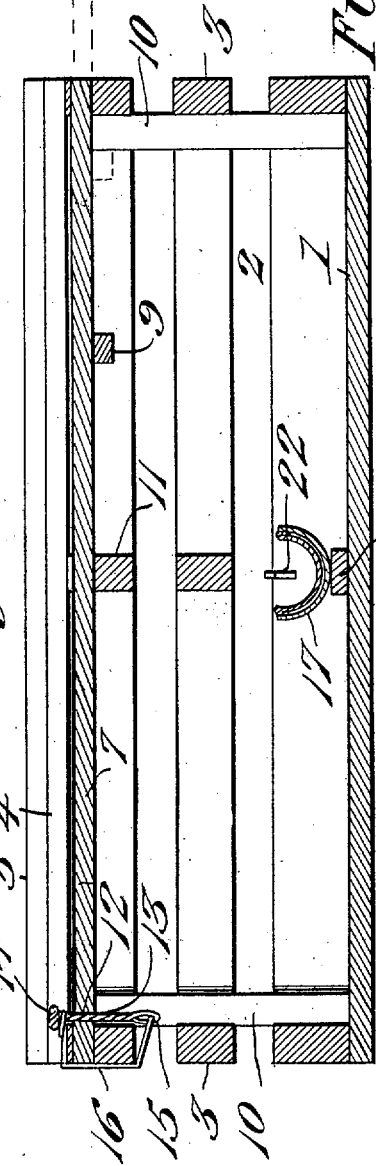
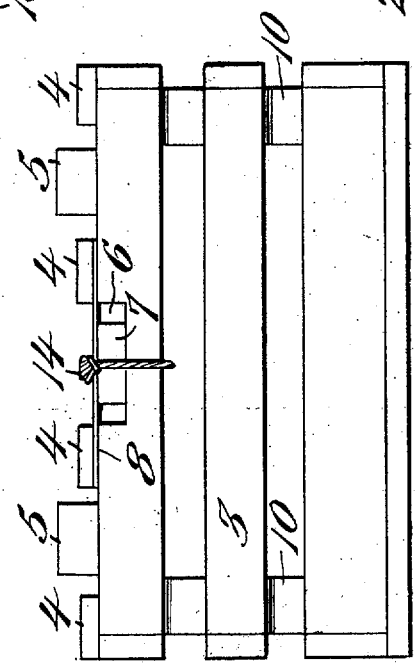

UNITED STATES PATENT OFFICE.

GEORGE J. COOK, OF PORT HURON, MICHIGAN.

WATER-TROUGH FOR POULTRY CRATES OR COOPS.

No. 884,716.     Specification of Letters Patent.     Patented April 14, 1908.

Application filed March 27, 1906. Serial No. 308,308.

*To all whom it may concern:*

Be it known that I, GEORGE J. COOK, a citizen of the United States, residing at Port Huron, in the county of St. Clair and State of Michigan, have invented certain new and useful Improvements in Water-Troughs for Poultry Crates or Coops, of which the following is a specification.

My invention has relation to improvements in water troughs for poultry crates or coops, and it consists in the construction and arrangement of parts, as will be hereinafter described and more particularly pointed out in the claim.

In the accompanying drawings, Figure 1 is a vertical longitudinal section through a coop or crate embodying the present invention. Fig. 2 is an end view thereof. Fig. 3 is a vertical cross-section taken centrally of the trough.

The coop or crate contemplated in this invention comprises essentially a bottom 1 which is ordinarily made imperforate, sides 2 composed of slats, and ends 3 also slatted, as shown. The top of the coop is formed partially by shallow or thin slats 4, while alternating with and interposed between the shallow slats 4 are spacing slats or rests 5 which extend considerably above the tops of the slats 4 to form rests for the superimposed coop or crate, whereby any number of crates may be piled one upon the other and yet ample air space left between the tops and bottoms of the coops so piled upon each other to provide for a thorough ventilation and the proper supply of the air to the poultry contained in the coop or crate.

The top slats of the ends of the coop are notched or recessed, as shown at 6, to provide for the reception of the opposite ends of a sliding door 7 in the form of a slat, the same being held in place, when closed, by means of keeper strips 8 extending over the notches or recesses 6 and secured beneath oppositely arranged top slats 4, as shown in Figs. 2 and 3. The sliding door 7 is provided on its under side with a stop cleat 9 which, as the door is slid in one direction, comes in contact with one end of the coop, or with the corner posts 10 thereof, and when slid in the other direction it comes in contact with a centrally arranged cross-bar or slat 11. This prevents the door from being entirely removed from the coop while permitting the same to be slid endwise in either direction for giving access to both ends of the coop.

Adjacent to one end, the door 7 is provided with a hole 12 in which is removably fitted a latch pin 13 provided at one end with a head 14, and at its opposite or inner end with a loop 15 to which may be connected a seal or securing device 16 which is shown in Fig. 1 in the form of a wire connected at one end to the loop 15 and at its opposite end passing around the pin 12 beneath the head 14 thereof.

Extending transversely across the bottom of the coop and about centrally therein is a trough holder or guide 17 which is substantially semi-cylindrical, said holder being secured firmly within the coop in any convenient manner, as by placing the same on a cross-bar or rest 18 and driving nails or other suitable fasteners 19 through the holder downward into said rest 18. Mounted slidingly in the holder 17 is a trough 20 also semi-cylindrical in cross-section and closed at its outer and inner ends by end walls 21. This trough is adapted to be slid endwise outward through an aperture in the side of the coop to replenish the water supply for the poultry and when slid back into its normal position, the inner end wall 21 thereof is engaged by a spring catch 22 which snaps over the top edge of the wall 21 and holds the same in the manner shown in Fig. 3. The spring catch 22 is secured to a fixed part of the coop adjacent to the inner end of the trough as shown in said figure. The piling of the coops one upon another will not interfere with replenishing the water supply by drawing the trough laterally and horizontally outward from the coops, the spring catch having a reversely inclined catch lip portion which enables it to spring aside either in inserting or removing the trough.

I claim:

The combination with a coop or crate for poultry and the like having an opening in one side of a semi-cylindrical trough holder with open ends secured transversely across the bottom of the coop, a water trough also constructed semi-cylindrical and provided with opposite end walls, said trough being slidably mounted in the holder and through the opening in the side of the crate, and a spring secured to the lower portion of the crate and having a bent V-shaped terminal which serves to be sprung over one of the end walls of the water trough, substantially as specified.

In testimony whereof I affix my signature in presence of two witnesses.

GEORGE J. COOK.

Witnesses:
 JAMES N. SCOTT,
 GEORGE YATES.